United States Patent
Marioni

(10) Patent No.: US 8,348,640 B2
(45) Date of Patent: Jan. 8, 2013

(54) MULTI-FUNCTIONAL BOTTOM PLATE FOR CENTRIFUGAL PUMPS, IN PARTICULAR FOR BOILER CIRCULATION PUMPS

(75) Inventor: Elio Marioni, Dueville (IT)

(73) Assignee: Askoll Holding S.r.l. (IT)

( * ) Notice: Subject to any disclaimer, the term of this patent is extended or adjusted under 35 U.S.C. 154(b) by 426 days.

(21) Appl. No.: 12/697,648

(22) Filed: Feb. 1, 2010

(65) Prior Publication Data

US 2010/0202905 A1 Aug. 12, 2010

(30) Foreign Application Priority Data

Feb. 6, 2009 (EP) .................................... 09425040

(51) Int. Cl.
*F04B 35/04* (2006.01)

(52) U.S. Cl. ...................... 417/423.14; 310/58; 310/71

(58) Field of Classification Search ............ 417/423.14, 417/423.7, 423.8; 310/58, 71, 89
See application file for complete search history.

(56) References Cited

U.S. PATENT DOCUMENTS

| | | | |
|---|---|---|---|
| 6,661,140 B2 * | 12/2003 | Agnes et al. | 310/89 |
| 8,049,385 B2 * | 11/2011 | Vadillo et al. | 310/89 |
| 2003/0099072 A1 | 5/2003 | Marioni | |
| 2003/0102740 A1 | 6/2003 | Marioni | |
| 2004/0160142 A1 | 8/2004 | Marioni | |
| 2004/0212263 A1 * | 10/2004 | Kitoh et al. | 310/99 |
| 2006/0034716 A1 * | 2/2006 | Marioni | 417/423.12 |
| 2007/0024133 A1 * | 2/2007 | Kato et al. | 310/68 D |

* cited by examiner

*Primary Examiner* — Devon Kramer
*Assistant Examiner* — Ryan Gatzemeyer
(74) *Attorney, Agent, or Firm* — Akerman Senterfitt

(57) ABSTRACT

A closure bottom plate 1 for electric pump 100, in particular for a boiler circulation centrifugal pump, is made of a cup-shaped motor cover 2 and a connector-holder cover 3. The bottom plate 1 has an internal aeration path 4, intended to allow the circulation—by natural convection—of air which is heated during the operation of the electric pump 100 preventing the formation of condensate inside the bottom plate 1. The internal aeration path 4 is extended between at least one inlet opening 22 arranged on the motor cover 2 and an outlet opening 36, successively crossing the internal volume of the motor cover 2, the coupling opening 21, and a labyrinth 32 defined by the connector-holder cover 3.

11 Claims, 5 Drawing Sheets

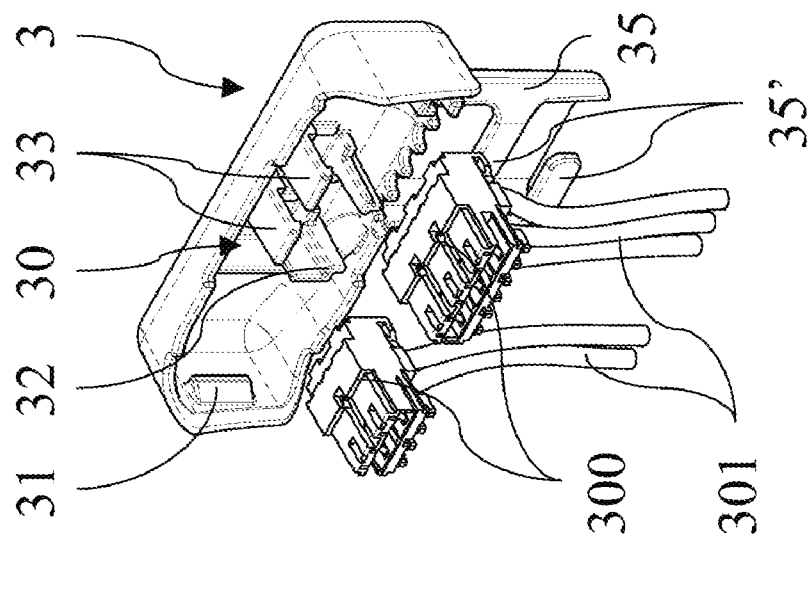
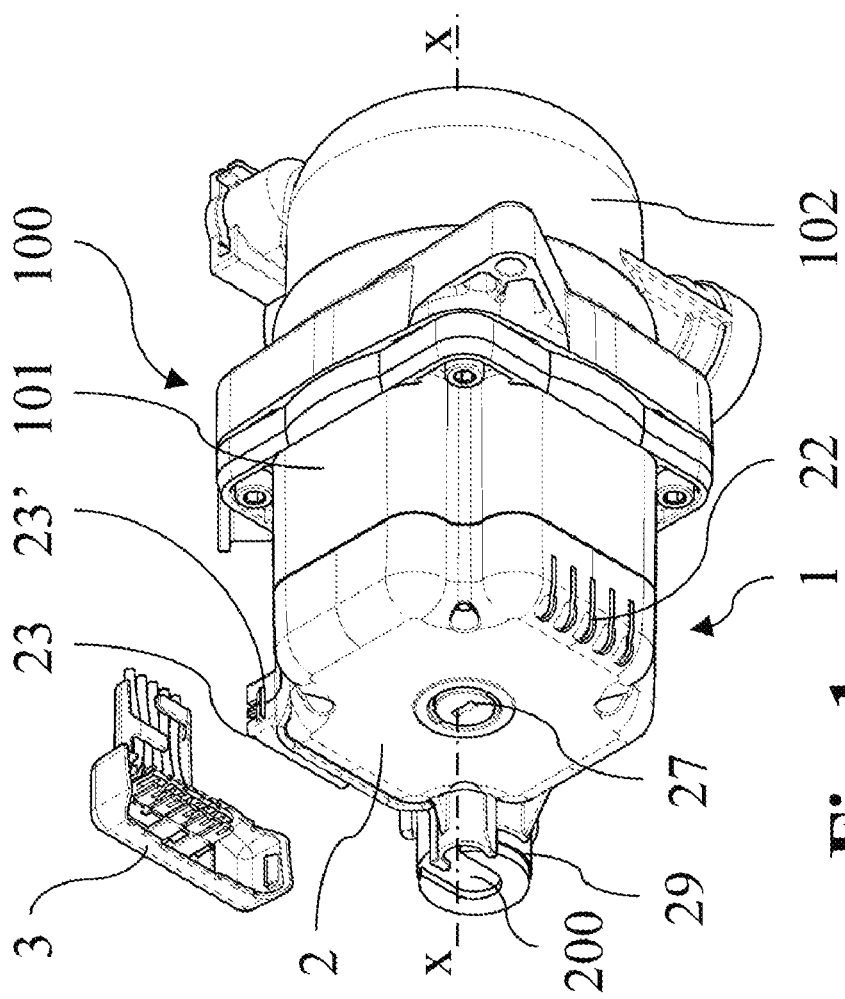
Fig. 7
Fig. 1

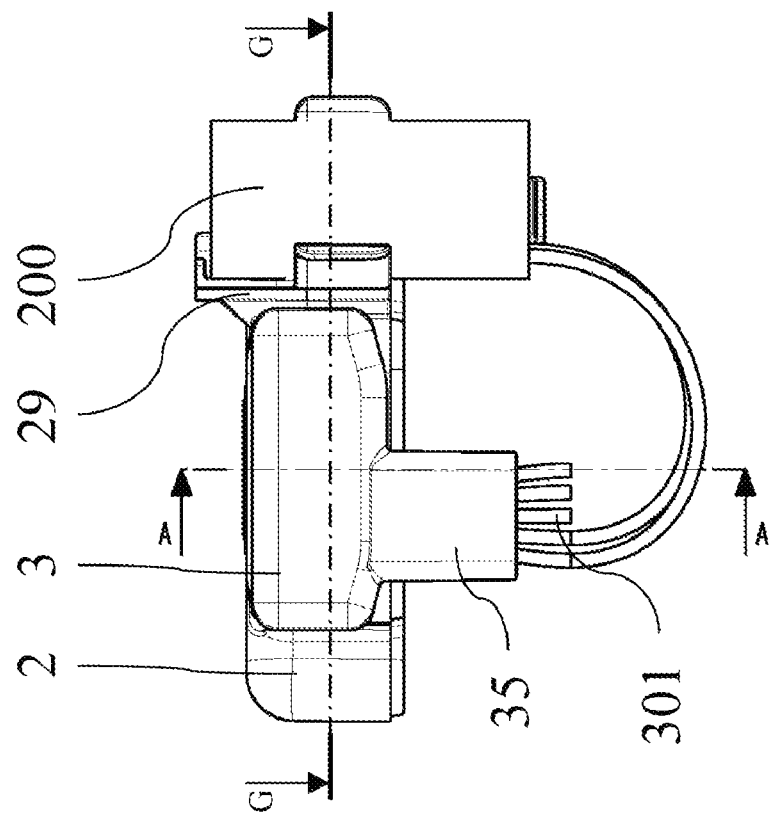
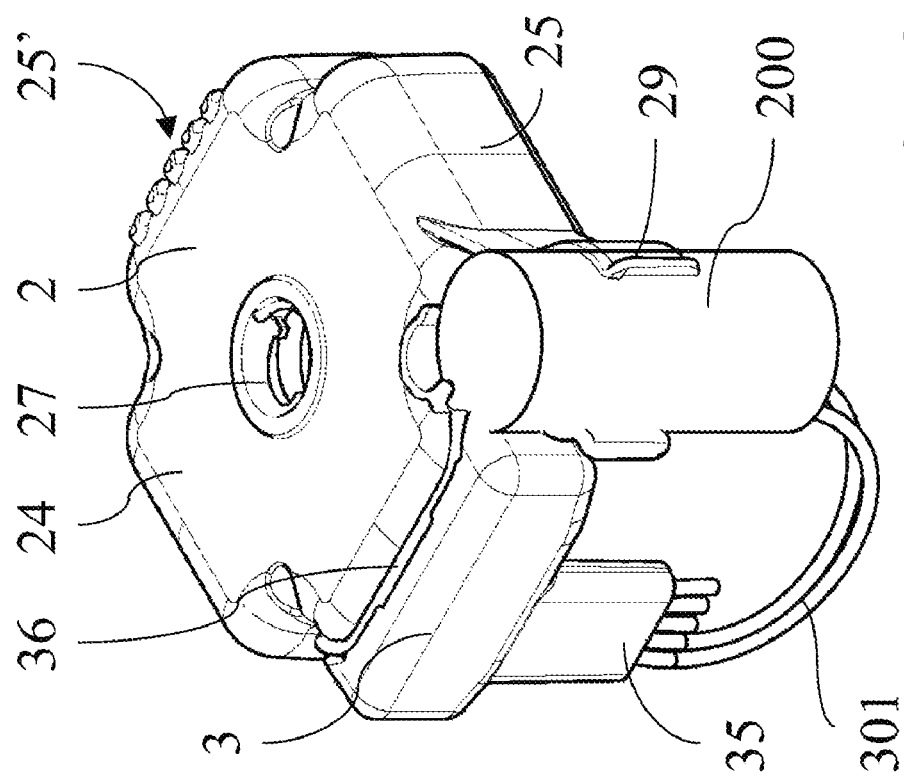
Fig. 3
Fig. 2

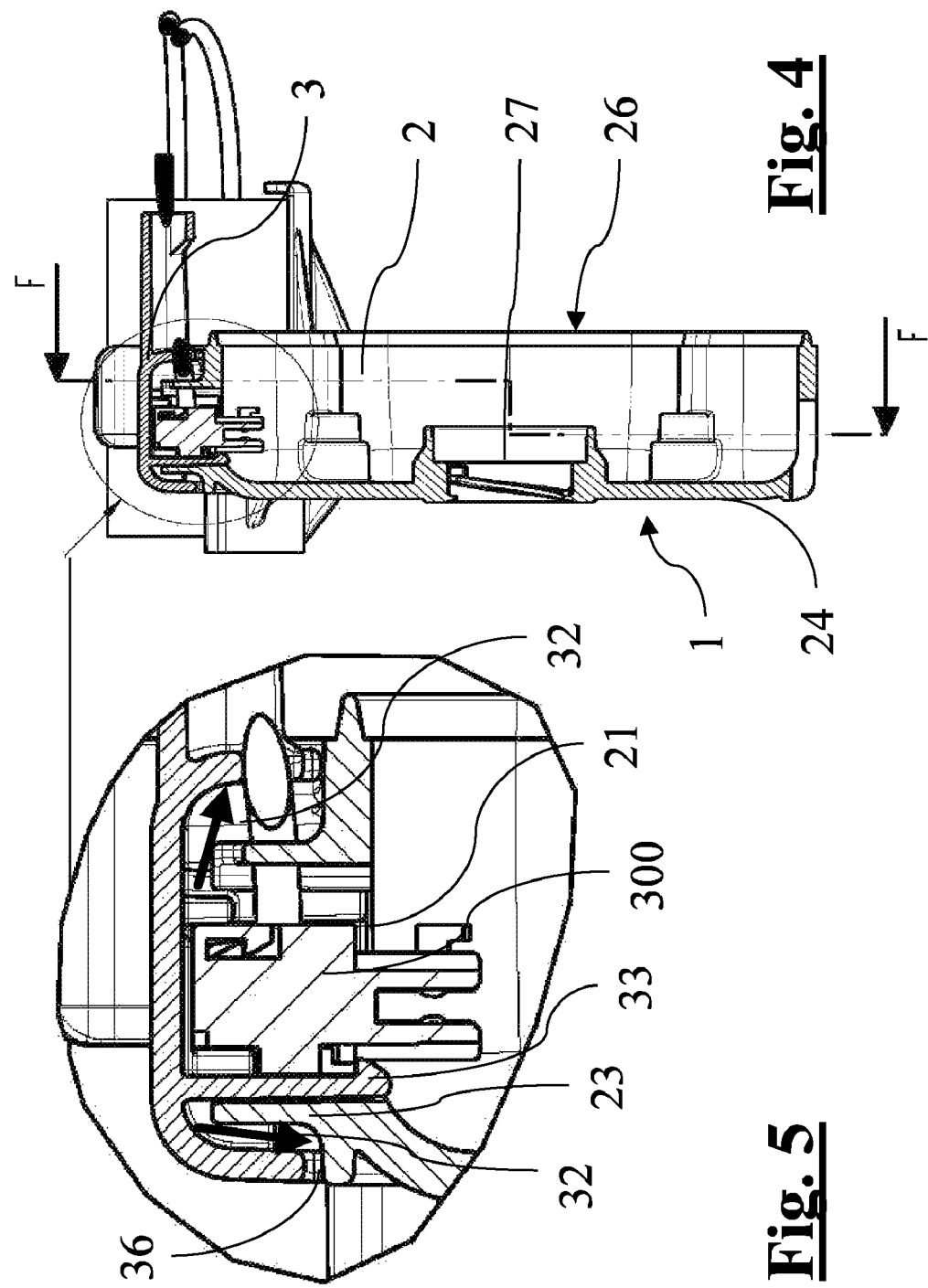

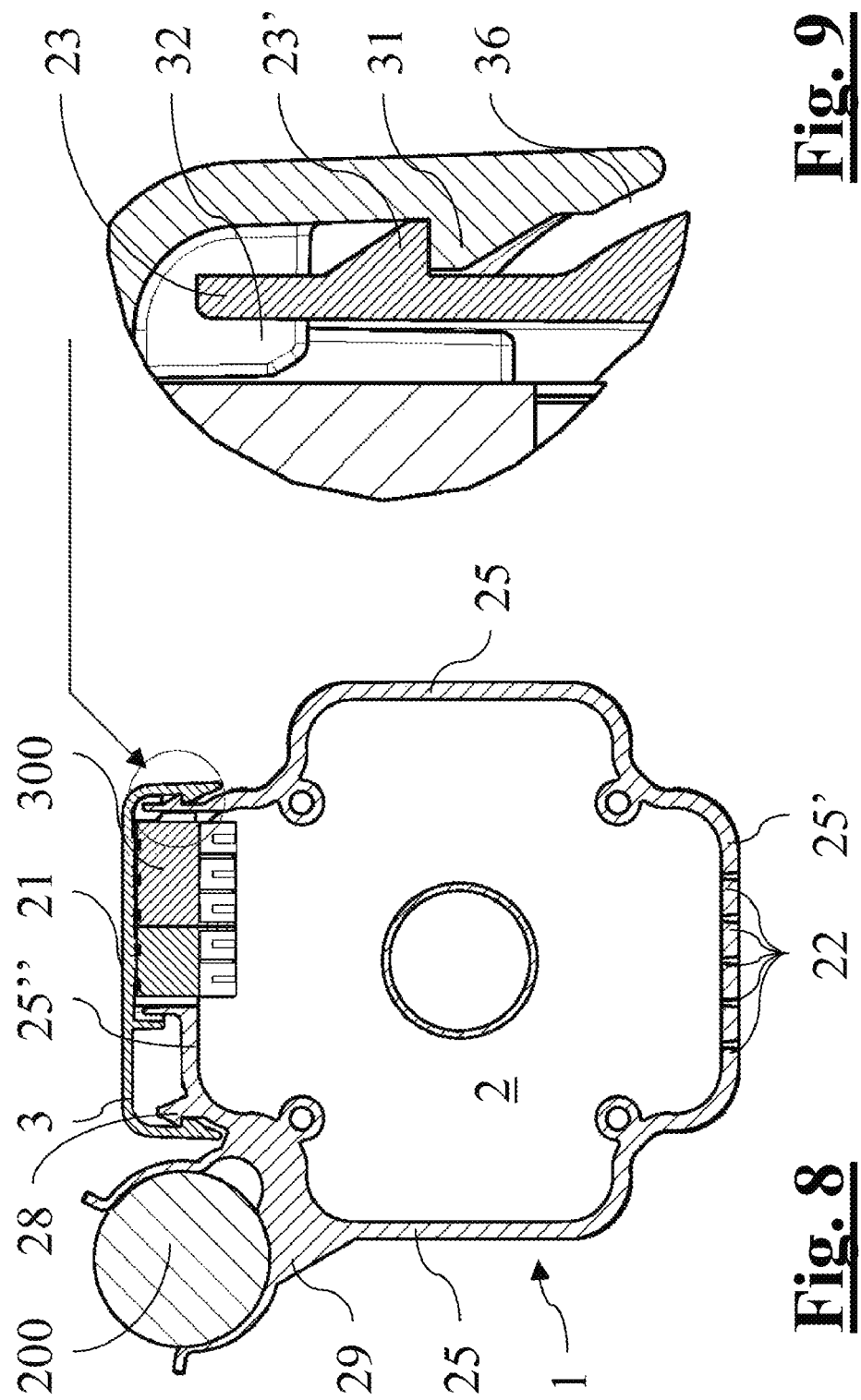

MULTI-FUNCTIONAL BOTTOM PLATE FOR CENTRIFUGAL PUMPS, IN PARTICULAR FOR BOILER CIRCULATION PUMPS

FIELD OF APPLICATION

The present invention regards a multi-functional closure bottom plate for a centrifugal electric pump, in particular a fluid circulation centrifugal pump of the type used in boiler heating systems. Electric pumps of this type usually have a box-shaped or tubular body for holding electromechanical elements associated to a head, which defines the volute of the pump. The bottom plate is the structural element that closes the end of the box-shaped body arranged oppositely with respect to the head.

PRIOR ART

Pumps of the abovementioned type are well known in the state of the art, and also commonly used in similar technological fields, even though different with respect to the one mentioned above.

The bottom plate that closes the box-shaped body is generally sealingly fixed to the rest of the casing, so as to avoid damaging penetrations of fluid into the delicate electromechanical components.

However, the thermal gradient due to the difference between the operating temperature of the electric pump and the atmospheric temperature may in unfortunate cases determine the formation, due to condensation, of water on the internal walls of the casing.

Such unpleasant event is particularly serious in case of motors controlled by a local control circuit board, which can be damaged by the presence of humidity even in a permanent manner.

In order to overcome the abovementioned drawback, the Italian patent application PD2001A000277, on behalf of the applicant, proposes a bottom plate provided with an inner cavity, in which a path defined by concentric collars allows evacuating, by convection, the hot air contained in the casing, though protecting the motor and the board from splashes of fluid coming from the outside.

Though substantially obtaining the preset objective of reducing the internal humidity, such a solution on the other hand has the disadvantage of a relatively high cost of production. As a matter of fact, in order to obtain the internal cavity, it is necessary to associate a double bottom to the bottom plate, through ultrasonic welding or gluing. Furthermore, such supplementary operation must be performed with considerable accuracy.

Furthermore, the inflowing air and the outflowing air share the same path, that being the reason why the internal circulation is not homogenous on the entire volume of the bottom plate, but mainly involves the areas in proximity to the recirculation holes.

Therefore, the technical problem on which the present invention is based is that of providing a bottom plate with low costs of production capable of providing a more efficient system for preventing the water condensation inside the body of an electric pump.

SUMMARY OF THE INVENTION

The abovementioned technical problem is resolved by a bottom plate according to the description of claim 1.

Further characteristics and advantages of the bottom plate according to the present finding shall be observed from the description, provided hereinafter, of a preferred embodiment provided for indicative and non-limiting purposes with reference to the attached drawings.

BRIEF DESCRIPTION OF THE DRAWINGS

FIG. 1 represents a perspective view of the bottom plate according to the present finding, associated to a circulation electric pump for heating systems;

FIG. 2 represents a perspective view of the bottom plate according to the finding;

FIG. 3 represents a side view of the bottom plate of FIG. 1;

FIG. 4 represents a sectional view, made according to axis A-A of FIG. 3, of the bottom plate;

FIG. 5 represents a considerably enlarged detail of the bottom plate of the view in FIG. 4;

FIG. 7 represents a perspective view of an element of the bottom plate of FIG. 1;

FIG. 8 represents a sectional view, made according to axis G-G of FIG. 3, of the bottom plate;

FIG. 9 represents a considerably enlarged detail of the bottom plate of the view in FIG. 8.

DETAILED DESCRIPTION

Figure 6:
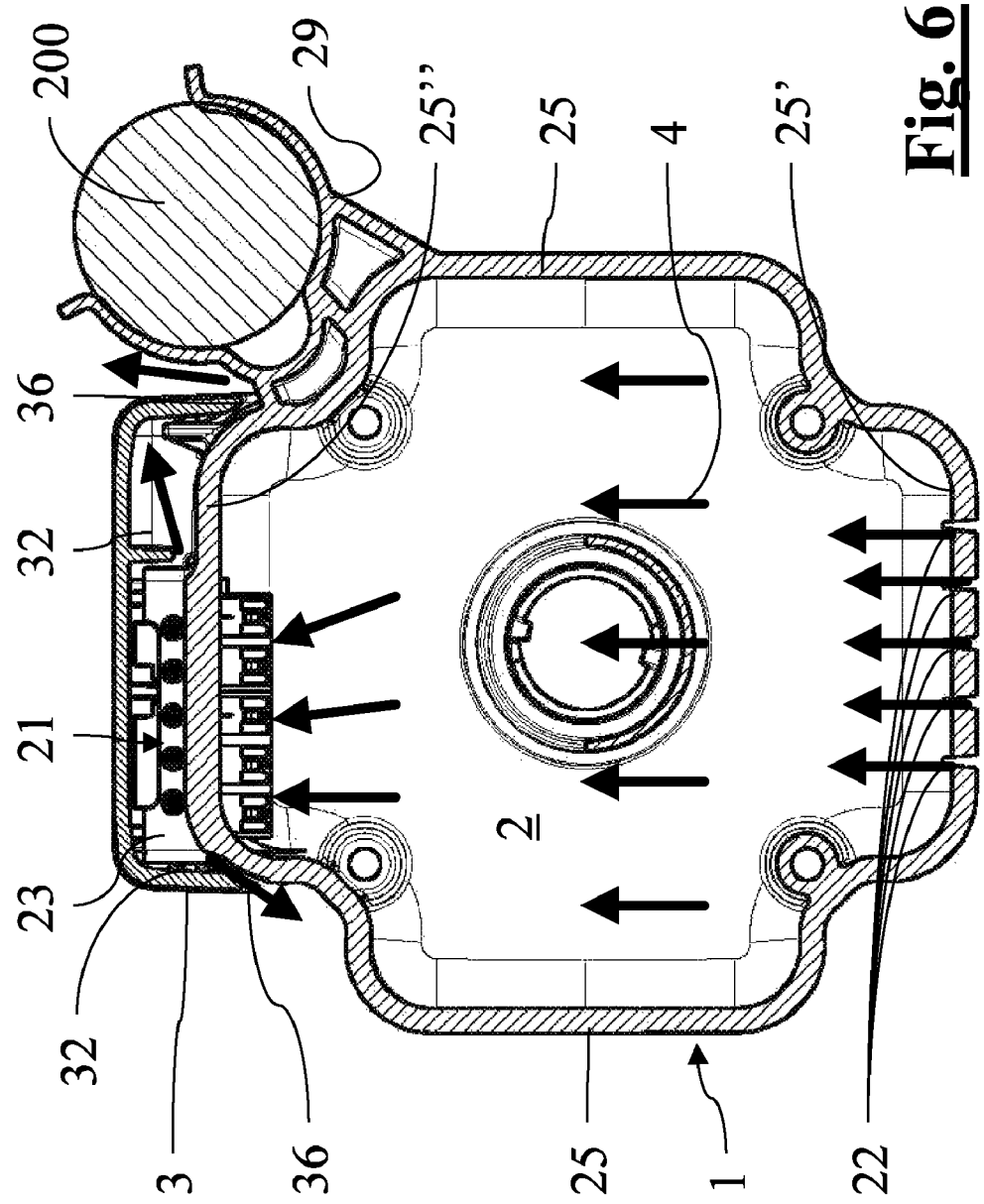
FIG. 6 represents a sectional view, made according to axis F-F of FIG. 4, of the bottom plate.

Referring to the attached drawings, 1 is generally used to identify a multi-functional closure bottom plate (hereinafter in the description simply referred to as bottom plate), intended, as observable in FIG. 1, to be associated to an electric pump 100, in particular to a centrifugal circulation electric pump 100 of the type used in the boiler heating systems circulators.

The electric pump 100 is preferably a permanent magnet synchronous pump, but such indication shall not be regarded in the limiting sense.

The electric pump 100 comprises a box-shaped containment body 101, inside which there are both the stator coils that surround the motor, and the possible electronic components (for example a local control circuit board may be provided for) for controlling the device. Such elements, being known, are not represented in the figures.

The box-shaped containment body 101 is associated at one of the ends thereof to a head 102, that defines the volute of the centrifugal pump, while the opposite end is closed by the bottom plate 1. The box-shaped containment body 101 is extended along a longitudinal axis x-x identified in FIG. 1; under normal operating conditions of the electric pump 100, the axis x-x is horizontal in such a manner that the bottom plate is arranged in a vertical plane.

The bottom plate 1 according to the invention comprises two components: an actual motor cover 2, cup-shaped and arranged to be associated—closing it—to the end of the box-shaped containment body 101 oppositely arranged with respect to the head 102; and a connector-holder cover 3, which has the function of bearing one or more electrical connectors 300 and comprises fixing means 30 for such purpose.

The electrical connectors 300, of the known type, are preferably two, just like in the embodiments illustrated in the attached figures. The electrical connectors are arranged at the end of the electrical cables 301 and they are conceived to be connected to the electric pump 100, to respectively allow electrical power supply and control thereof.

It should be observed that the connection of the electrical connectors 300 to the electric pump 100 may imply, depending on the manufacture of the operated device, both the direct connection with the stator coils of the electric motor, and, preferably, the coupling onto a local circuit board intended to control the motor.

In order to allow the abovementioned connection, the motor cover 2 has a coupling opening 21; the connector-holder cover 3 can thus be associated, in a mounted configuration (illustrated in FIGS. 2-5, 8-9), to such coupling opening 21. At such mounted configuration, the above-mentioned fixing means 30 hold the electrical connectors 300 in a preset connection position with respect to the electric pump 100.

Furthermore, the mounted bottom plate 1 has an internal aeration path 4, which as previously mentioned allows—by natural convection—the circulation of the air heated during the operation of the electric pump 100, preventing the formation of condensate inside the bottom plate 1 itself.

Such internal aeration path 4 is extended at least between an inlet opening 22, arranged on the motor cover 2 and an outlet opening 36. The internal aeration path, starting from the inlet opening, successively crosses the internal volume of the motor cover 2, the aforementioned coupling opening 21, and a labyrinth (path) 32 defined by the connector-holder cover 3, then exiting through the outlet opening 36. It should be observed that under normal operating conditions of the electric pump 100, the inlet opening 22 is in the lower part of the internal aeration path 4 and thus at a lower height with respect to the outlet opening 36, as mentioned, to facilitate the natural convection through the described path.

The abovementioned labyrinth 32 develops in such a manner as to allow the venting of the convection air, but simultaneously prevent the entry of liquid from the external due to sprays or the like. The path and its modes of definition shall be outlined in detail in the description provided hereinafter.

The presence of the aeration path 4 thus allows the circulation of air through the entire volume of the bottom plate 1, exploiting the natural connective movements of the fluid heated during the operation of the electric pump. Such heating is due to the presence of electronic components active inside the bottom plate 1, or otherwise due to the closeness of the bottom plate 1 to the running electric motor. The connective motion of the heated air, that prevents the formation of condensate inside the electromechanical apparatus, is schematically represented by means of continuous arrows in the attached FIGS. 5 and 6.

Now, following is a detailed description of the illustrated embodiment of the device according to the finding.

The motor cover 2 comprises a flat bottom wall 24, departing from whose perimeter are four lateral walls 25, 25', 25" that define the mouth 26 conceived to be associated to the box-shaped containment body 101 described above.

The aforementioned inlet opening 22 and the coupling opening 21 are preferably arranged on two opposite lateral walls, in such a manner that the air flow that crosses the aeration path 4 involves the entire volume of the bottom plate 1.

The adjacent lateral walls 25, 25', 25" are connected to each other by double-S-shaped wavy sections, obtained in proximity to which are four holes for inserting screws for connecting to the box-shaped containment body 101.

In collaboration with or replacing the connection screws, a ultrasonic welding of the bottom plate 1 can be performed on the box-shaped containment body 101.

At the centre of the bottom wall 24 an inspection hole 27, closable with a special cap, may be provided. Such a hole allows access into the structure, for maintenance purposes, in cases where the motor cover 2 is permanently associated to the electric pump 100.

It should be observed that, under normal operating conditions of the electric pump 100, the bottom wall 24 lies on a vertical plane; the lateral wall 25' which has the aeration openings 22 is preferably directed downwards and hence the oppositely arranged wall 25" which has the coupling opening is directed upwards. In this manner, the convective stream which transports the hot air upwards allows evacuating the latter through the labyrinth 32.

The inlet openings 22 are preferably defined, as observable in FIGS. 1, 6 and 8, by a plurality of parallel slots obtained on the lower wall 25' of the motor cover 2.

The motor cover 2 further comprises a projecting panel 23, directed inwards the bottom plate 1, perimetrally with respect to the coupling opening 22.

Said panel 23, which has a parallelepiped structure, accommodates the electrical connectors 300 therein borne by the connector-holder cover 3. Furthermore, the projecting panel 23 is inserted inside the structure of the connector-holder cover 3, when the latter is mounted.

However, the cover structure 3 and the panel 23 are not in direct contact, and the cavity present between the two elements defines the part of the labyrinth 32 arranged at the end of the aeration path 4, as observable in the attached FIGS. 5 and 6.

In the mounted configuration, the labyrinth 32 is thus composed of a first part defined by the clearances and by the cavities present between the mounted electrical connectors 300 and the projecting panel 23 and a second part developing between the cover structure 3 and the projecting panel 23, then in communication with the external environment through the perimeter opening between the motor cover 2 and the connector-holder cover 3, i.e. by means of the previously described outlet opening 36.

The connector-holder cover 3 has a main half-shell-shaped portion with a longitudinal extension that faithfully matches that of the upper wall 25" on which it is mounted. The main half-shell-shaped portion is the one that bears the electrical connectors 300 therein and the one that, in mounted configuration, holds the projecting panel 23.

In order to be snap-coupled on said upper wall 25", the main portion of the connector-holder cover 3 has two reliefs 31 arranged on its internal surface at one of its longitudinal ends. As observable in FIGS. 8 and 9, one of these reliefs 31 is engaged with an elastic tooth 28 projecting with respect to the upper wall 25" of the motor cover 2; instead, the other one is engaged with a counter-shaped end portion 23' of the previously described projecting panel 23.

The fixing means 30 provided for by the connector-holder cover 3 comprise elastic coupling teeth 33, arranged on an inner surface of the cover itself, which collaborate to provide an accommodation for the electrical connectors 300 having a rigid seat 32 obtained projecting on the same surface. Such structural elements, well visible in the perspective view of FIG. 7, allow the snap-insertion of said electrical connectors 300.

Furthermore, in order to protect at least the final part of the electrical cables 301 connected to the abovementioned connectors 300 against splashes and wear, the connector-holder cover has a protection and retention rigid casing 35, which departs from the main portion to the half-shell. The internal volumes of such rigid casing 35 and of the main half-shell-shaped portion are separated by a septum, obtained in which are semicircular grooves fittingly arranged for the passage of the electrical cables 301.

The rigid casing 35 defines a channel for accommodating the electrical cables 301, that are maintained in position by means of two retention arms 35', opposite and offset according to the direction of longitudinal development of the casing 35.

The motor cover 2 further comprises a cylindrical external seat 29 intended to accommodate a phasing capacitor 200 connectable, by means of the aforementioned electrical cables 301, to one of the electrical connectors 300 held by the connector-holder cover 3.

The main advantage of the aforedescribed bottom plate lies in the efficient action of preventing the formation of condensate, involving the entire internal volume of the bottom plate itself.

Another clear advantage of the bottom plate according to the finding lies in the great simplicity of obtaining the air release labyrinth, which is made up of the geometric interaction between simple forms of the two covers manually coupled to each other.

Another advantage is determined by the external positioning of the phasing capacitor, which considerably reduces the risk of overheating the electric pump device.

Another advantage lies in the protection of all the electrical and electronic elements from splashes or accidental contact with water or other liquids or vapours, obtained due to the labyrinth and the various casings and covers, advantageously made of waterproof material.

Obviously, a man skilled in the art may subject the aforedescribed bottom plate—with the aim of meeting supplementary and specific requirements—to numerous modifications and variants, all falling within the scope of protection of the invention as defined by the following claims.

The invention claimed is:

1. A closure bottom plate for a centrifugal electric pump comprising a box-shaped containment body associated to a head, said closure bottom plate comprising:
   a cup-shaped motor cover arranged to close the end of the box-shaped containment body oppositely arranged with respect to the head, said motor cover having a coupling opening; a connector-holder cover,
   associable in a mounted configuration to said coupling opening, comprising fixing means conceived to hold, at said mounted configuration, at least one electrical connector in a preset position for connection to the electric pump;
   said bottom plate having an internal aeration path, intended to allow circulation—by natural convection—of air which is heated during the operation of the electric pump thus preventing the formation of condensate inside the bottom plate, said internal aeration path being extended between at least one inlet opening arranged on the motor cover and one outlet opening and successively crossing the internal volume of the motor cover, said coupling opening, and a labyrinth defined by the connector-holder cover, said labyrinth being a path comprising at least one bend so as to prevent the entry of liquid due to splashes or sprays from the outside.

2. The bottom plate according to claim 1, wherein said outlet opening is defined by a perimetrical aperture defined between the motor cover and the connector-holder cover mounted thereon.

3. The bottom plate according to claim 2, wherein the motor cover comprises a projecting panel perimetral to the coupling opening, said projecting panel being inserted inside the connector-holder cover, a cavity present between said connector-holder cover and said projecting panel defining at least part of the labyrinth.

4. The bottom plate according to claim 3, wherein the connector-holder cover comprises two reliefs on its inner surface conceived to collaborate with an elastic tooth of the motor cover and a counter-shaped portion of the projecting panel allowing the snap-coupling of the connector-holder cover onto the motor cover.

5. The bottom plate according to claim 1, wherein the fixing means comprise elastic coupling teeth arranged on an inner surface of the connector-holder cover.

6. The bottom plate according to claim 1, wherein the connector-holder cover comprises a rigid casing for protecting and holding electrical cables associated to the electrical connectors.

7. The bottom plate according to claim 1, wherein the inlet opening of the aeration path is arranged at a lower height with respect to the outlet opening under normal operating conditions of the electric pump.

8. The bottom plate according to claim 7, wherein said motor cover comprises a bottom wall, arranged on a vertical plane, and lateral walls which connect said bottom wall to the box-shaped containment body; said inlet openings and said coupling opening being arranged on two opposite lateral walls, respectively on a lower and upper wall.

9. The bottom plate according to claim 8, wherein the inlet openings are a plurality of parallel slots obtained on the lower wall of the motor cover.

10. The bottom plate according to claim 1, wherein the motor cover comprises an external seat intended to accommodate a phasing capacitor connectable to one of the electrical connectors held by the connector-holder cover.

11. A closure bottom plate for a centrifugal electric pump comprising a box-shaped containment body associated to a head, said closure bottom plate comprising:
   a cup-shaped motor cover arranged to close the end of the box-shaped containment body arranged opposite the head, said closure bottom plate comprising a protruding frame which surrounds a coupling opening; and
   a connector-holder cover mounted on said cup-shaped motor cover, said connector-holder cover comprising fixing means holding an electrical connector inserted within the coupling opening and releasably connected to the electric pump;
   said connector-holder cover further comprising a cup-shaped frame with lateral walls surrounding the protruding frame;
   said closure bottom plate having an internal aeration path extending from an inlet opening arranged on the motor cover to an outlet opening and crossing a labyrinth, at least a part of said labyrinth being defined between the protruding frame of the closure bottom plate and the lateral walls of the cup-shaped frame of the connector-holder cover.

* * * * *